US012086738B2

(12) United States Patent
Balachandran et al.

(10) Patent No.: US 12,086,738 B2
(45) Date of Patent: Sep. 10, 2024

(54) RESOURCE ALLOCATION FOR AN AUTONOMOUS VEHICLE TRANSPORTATION SERVICE

(71) Applicant: Waymo LLC, Mountain View, CA (US)

(72) Inventors: Ganesh Balachandran, Mountain View, CA (US); Salil Pandit, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 890 days.

(21) Appl. No.: 16/953,862

(22) Filed: Nov. 20, 2020

(65) Prior Publication Data

US 2022/0164720 A1    May 26, 2022

(51) Int. Cl.
*G06Q 10/02* (2012.01)
*G06N 5/04* (2023.01)
*G06N 20/00* (2019.01)

(52) U.S. Cl.
CPC ......... *G06Q 10/025* (2013.01); *G06N 5/04* (2013.01); *G06N 20/00* (2019.01)

(58) Field of Classification Search
CPC ......... G06Q 10/025; G06N 20/00; G06N 5/04
See application file for complete search history.

(56) References Cited

U.S. PATENT DOCUMENTS

| 2016/0041554 | A1* | 2/2016 | Takano | B60W 50/14 701/25 |
| 2019/0197798 | A1 | 6/2019 | Abari et al. | |
| 2019/0316926 | A1* | 10/2019 | Wang | G01C 21/3484 |
| 2020/0126417 | A1 | 4/2020 | Selvam et al. | |
| 2020/0241564 | A1 | 7/2020 | Goldman | |
| 2020/0249047 | A1 | 8/2020 | Balva | |
| 2020/0378775 | A1* | 12/2020 | Beaurepaire | G01C 21/3423 |
| 2020/0409362 | A1* | 12/2020 | Long | B60W 50/14 |
| 2021/0035378 | A1* | 2/2021 | Lekutai | G07C 5/008 |
| 2021/0331712 | A1* | 10/2021 | Lee | B60W 50/14 |
| 2022/0164720 | A1* | 5/2022 | Balachandran | G06N 20/00 |
| 2022/0238222 | A1* | 7/2022 | Neuberg | G16H 50/20 |

OTHER PUBLICATIONS

Gylberth, Roan , An Introduction to AdaGrad, Konvergen.AI, Medium, https://konvergen.ai, pp. 1-6, May 2, 2018.

* cited by examiner

*Primary Examiner* — David E Choi
(74) *Attorney, Agent, or Firm* — Botos Churchill IP Law (57) ABSTRACT

Aspects of the disclosure relate to generating a model to assess maximum numbers of concurrent trips for an autonomous vehicle transportation service. For instance, historical trip data, including when requests for assistance were made, response times for those requests for assistance, and a number of available resources when each of the requests for assistance were made may be received. In addition, a number of concurrent trips, or trips that overlap in time, occurring when each of the requests for assistance were made may be received. The model may be trained using the historical trip data and the numbers of concurrent trips. The model may be configured to provide a maximum number of concurrent trips given a period of time, a number of available resources, and a response time requirement.

22 Claims, 7 Drawing Sheets

RESOURCE ALLOCATION FOR AN AUTONOMOUS VEHICLE TRANSPORTATION SERVICE

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be used to provide transportation services. Other systems which provide transportation services typically include drivers or conductors who are tasked with making decisions about how to operate vehicles. Such services may include some backend server systems which can dispatch vehicles to certain locations to provide transportations services as well as provide fleet management and vehicle staging instructions.

BRIEF SUMMARY

Aspects of the disclosure provide a method of generating a model to assess maximum numbers of concurrent trips for an autonomous vehicle transportation service. The method includes receiving, by one or more processors of one or more server computing devices, historical trip data including when requests for assistance were made, response times for those requests for assistance, and a number of available resources when each of the requests for assistance were made; receiving, by the one or more processors, a number of concurrent trips occurring when each of the requests for assistance were made, wherein concurrent trips are trips that overlap in time; and training, by the one or more processors, the model using the historical trip data and the numbers of concurrent trips, and wherein the model is configured to provide a maximum number of concurrent trips given a period of time, a number of available resources, and a response time requirement.

In one example, the number of available resources when each of the requests for assistance was made is a number of roadside assistance operators to respond to requests for assistance from vehicles of the service. In another example, the number of available resources when each of the requests for assistance was made is a number of remote assistance operators to respond to requests for assistance from vehicles of the service. In another example, the number of available resources when each of the requests for assistance was made is a number of passenger support agents to respond to passenger requests for assistance. In another example, the method also includes determining response rates based on the response times, and wherein the training further involves using the response rates to train the model. In another example, the method also includes inputting a desired response rate, a number of available resources, and a given period of time into the model in order to determine a maximum number of concurrent trips for the given period of time. In this example, the method also includes using the maximum number of concurrent trips to determine a number of resources required for the given period of time. In this example, the method also includes using the number of resources to adjust resource staffing. In addition, the resource staffing includes a number of roadside assistance operators to respond to requests for assistance from vehicles of the service. In addition or alternatively, the resource staffing includes a number of passenger support agents to respond to passenger requests for assistance. In this example, the method also includes estimating a total amount of time that passenger support agents will be needed during the given period of time, and wherein using the number of resources to adjust resource staffing is further based on the estimated total amount of time. In addition or alternatively, the resource staffing includes a number of remote assistance operators to respond to requests for assistance from vehicles of the service. In this example, the method also includes estimating a maximum number of moving vehicles of the service during the given period of time, and wherein using the number of resources to adjust resource staffing is further based on the estimated maximum number of moving vehicles of the service. In another example, the method also includes receiving map information for a service area of the service and wherein the training is further based on the map information. In another example, the method also includes receiving a number of trips planned when the requests for assistance were made and wherein the training is further based on the number of trips planned. In this example, the method also includes receiving an average duration for the trips planned when the requests for assistance were made and wherein the training is further based on the average durations for the trips planned. In addition or alternatively, the method also includes receiving starting and ending points for the trips planned when the requests for assistance were made and wherein the training is further based on the starting and ending points. In one example, the method also includes using the maximum number of concurrent trips to make trip scheduling decisions. In addition, using the maximum number of concurrent trips to make trip scheduling decisions includes delaying a start of a trip. In addition or alternatively, using the maximum number of concurrent trips to make trip scheduling decisions includes requesting a passenger join a car pool. In addition or alternatively, the method also includes using the maximum number of concurrent trips to make trip scheduling decisions includes requesting that a passenger delay a trip. In addition or alternatively, the method also includes using the maximum number of concurrent trips to make trip scheduling decisions includes scheduling a trip for a passenger based on a history of the passenger requesting assistance.

DETAILED DESCRIPTION

Overview

To ensure safety when operating a fleet of autonomous vehicles for an autonomous vehicle transportation service, different operations teams and resources such as computing resources and bandwidth may be required. For example, these operations teams may include remote assistance operators (who may monitor vehicle behaviors and/or provide assistance remotely), passenger support agents (who may communicate with passengers during trips), roadside assistance operators (who may provide roadside assistance services such as tire changes and other maintenance services), technical specialists (to address networking and other potential issues), etc. Of course, the number of such operators and agents available may affect the number of vehicles of the fleet that can be driving and providing trip and other services. In order to strike a balance, a model may be generated in order to determine exactly what number of such operators, agents, and other resources are required at any given point in time. In addition, knowing the number of available operators, agents, and other resources may be used to determine how many concurrent trips can be made at any given time and also to make scheduling decisions for trips.

In order to do so, the model maybe generated using historical trip data relating to when vehicles of the fleet have requested assistance, passengers have requested assistance, technical specialists have been needed, bandwidth availability, number of concurrent trips, and so on. This information may be collected over time. In addition, each request for assistance may be associated with a response time, how long it took for a remote assistance operator to resolve an issue with the vehicle or how long it took for a roadside assistance operator to reach the vehicle, or how long it took for a passenger support agent to connect with a passenger. The response times may also be converted to response rates. By using rates, this may allow operators to better utilize the model in order to meet desired expectations with greater flexibility.

Inputs for training the model may include the hour of the day, day of the week, the number of resources, and the aforementioned response times and/or rates. Outputs for training the model may include the number of concurrent trips, and the number of trips that are occurring at the same time.

Regarding the number of concurrent trips, a trip may be considered active from the moment it is assigned to a vehicle to where the vehicle drops off a passenger plus some additional amount of time. Based on this, the concurrent trips may be calculated at every day of week, hour of day (based on trip assignment time), and for different locations or service areas.

Because the number of resources and response times are used as training inputs, and the concurrency is used as training output, for any input hour, day of week, number of available resources, and desired response times, the model may be trained to output the maximum concurrency, or the maximum number of concurrent trips that can be scheduled while still meeting the desired response times. Once the model is generated, when scheduling trips in order to limit the number of concurrent trips as well as to provide analytics and data to identify situations in which additional resources are required (e.g. in order to meet desired response times).

The features described herein may allow for a fully autonomous transportation service which can automatically balance the number of passengers or trips served with the number of resources currently available. This may make the service both safer and scalable. In addition, by reducing the amount of understaffing and overstaffing, this may improve the overall efficiency of the service while at the same time providing for a service which can meet desired response times and rates without compromising on the ability to service trips.

EXAMPLE SYSTEMS

Figure 1:
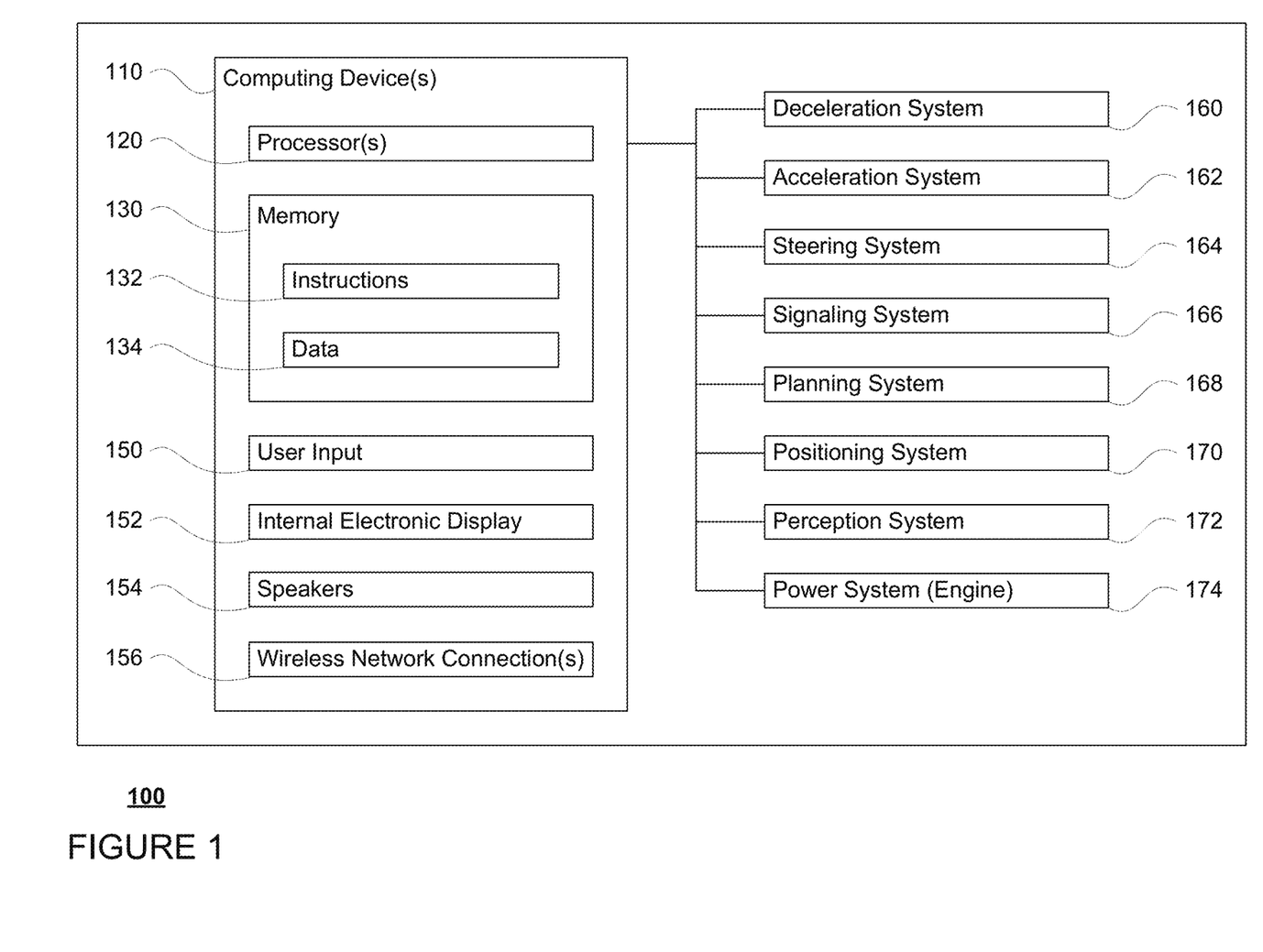
FIG. 1 is a functional diagram of an example vehicle in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers 154 to provide information to a passenger of the vehicle 100 as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system in order to signal the vehicle's intent to other drivers or vehicles, for example, by lighting turn signals or brake lights when needed.

Routing system 166 may be used by the computing devices 110 in order to generate a route to a destination. Planning system 168 may be used by computing device 110 in order to follow the route. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pullover spots, vegetation, or other such objects and information.

The routing system 166 may use the map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 170 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 2:
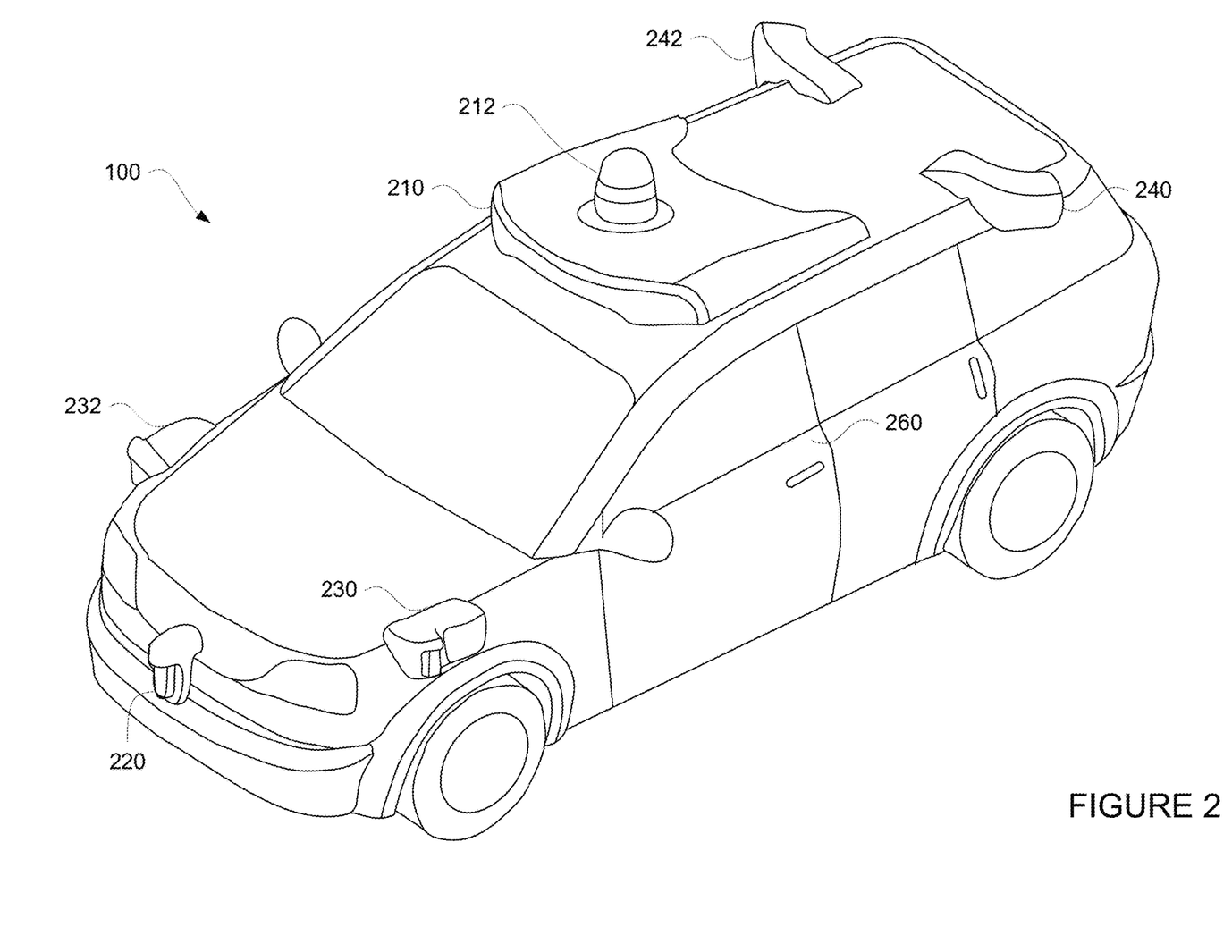
FIG. 2 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 2 is an example external view of vehicle 100. In this example, roof-top housing 210 and dome housing 212 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 166. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 3:
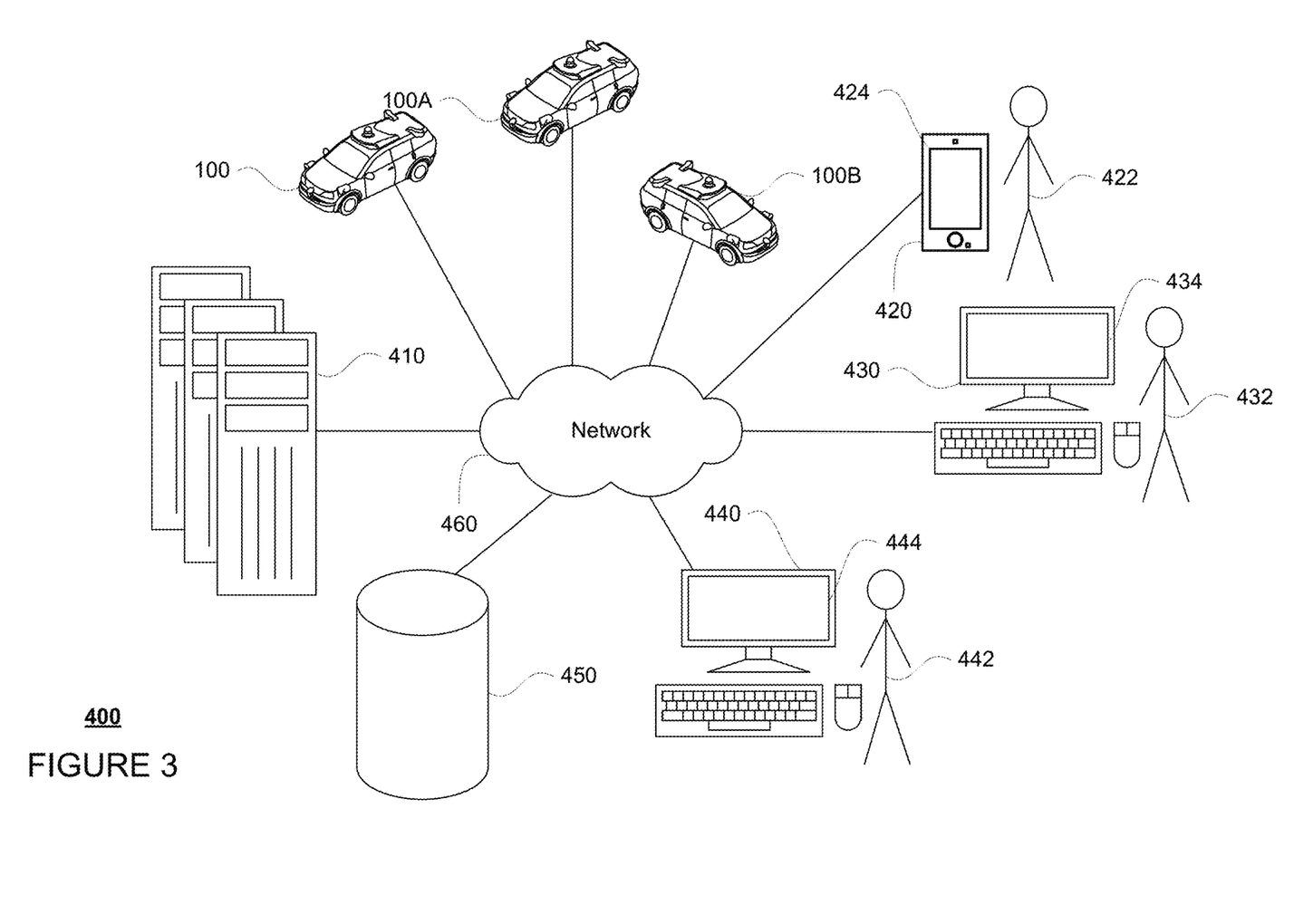
FIG. 3 is a pictorial diagram of an example system in accordance with aspects of the disclosure.
Figure 4:
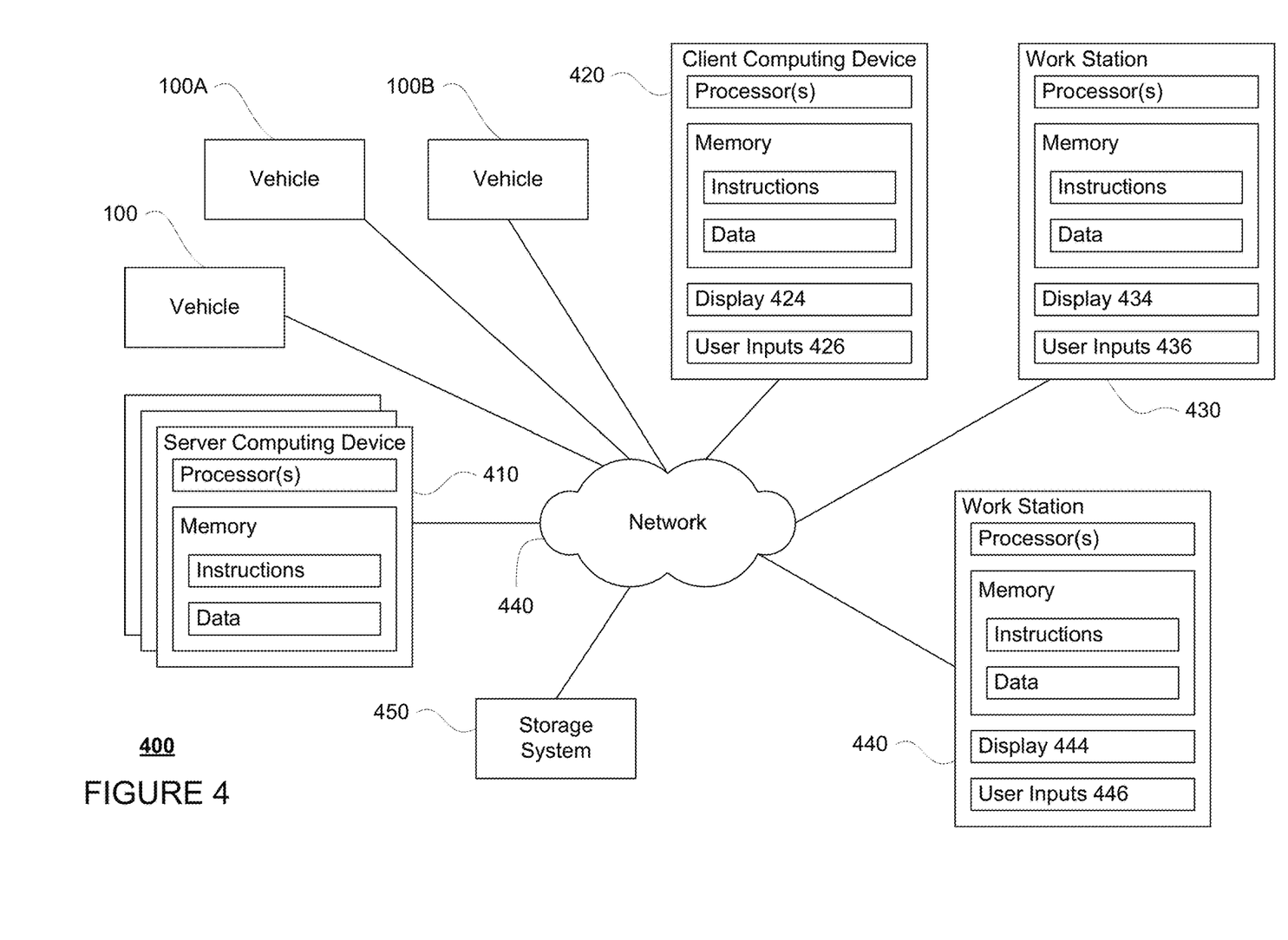
FIG. 4 is a functional diagram of the system of FIG. 3 in accordance with aspects of the disclosure.

Computing device 110 of vehicle 100 may also receive or transfer information to and from other computing devices, such as those computing devices that are a part of the transportation service as well as other computing devices. FIGS. 3 and 4 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, the one or more server computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system which can be used to schedule trips and dispatch vehicles such as vehicles 100, 100A, 100B to different locations in order to pick up and drop off passengers. In addition, the server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. As an example the user may input information using a small keyboard, a keypad, microphone, using visual signals with a camera, or a touch screen.

In some examples, client computing device 420 may be a mobile phone used by passenger of a vehicle. In other words, user 422 may represent a passenger. In addition, client computing device 430 may represent a smart watch for a passenger of a vehicle. In other words, user 432 may represent a passenger. The client computing devices 430, 440 may represent workstations for operations personnel, for example, a remote assistance operator, a passenger support agent, or someone who may provide remote assistance to a vehicle and/or a passenger. In other words, user 432 may represent a passenger support agent, and user 442 may represent a remote assistance operator. Although only a few passengers and operations personnel are shown in FIGS. 3 and 4, any number of such passengers and operations personnel (as well as their respective client computing devices) may be included in a typical system.

Figure 5:
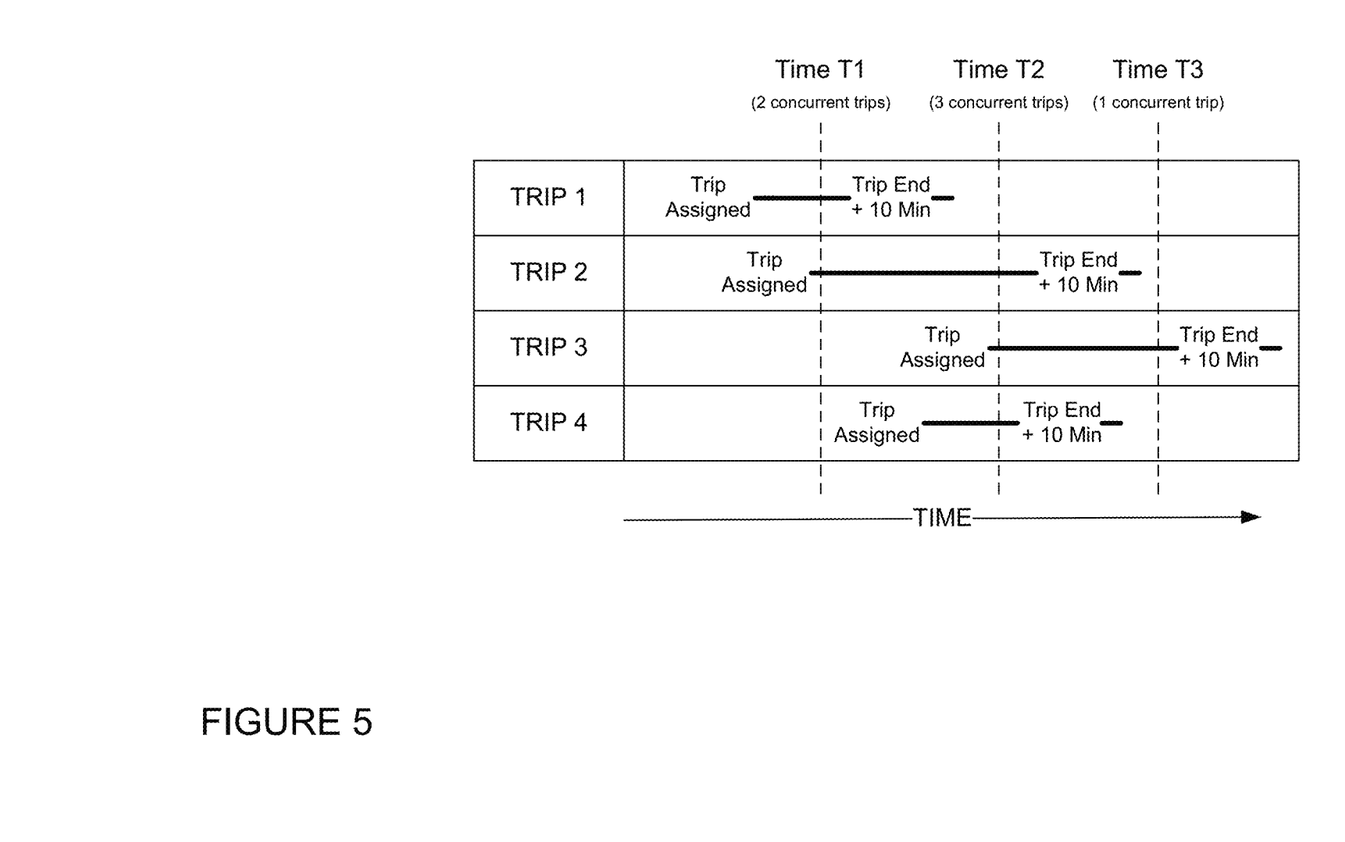
FIG. 5 is an example representation of concurrent trips in accordance with aspects of the vehicle.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices of the server computing devices 410, in order to perform some or all of the features described herein. For instance, the storage system 450 may store historical trip data, concurrent trip information, as well as data for one or more of the models generated and trained as discussed further below.

The server computing devices 410 may be configured to schedule trips by selecting vehicles for ride or transport services depending upon locations of the vehicles, passengers and/or cargo, destinations, etc. This information, including the locations of vehicles, status of passengers and/or cargo, destinations, etc. may be tracked, for instance, in a status table of the storage system 450. The server computing devices 410 may also track the state of the vehicles using information that is periodically broadcast by the vehicles, specifically requested by the dispatching system and provided by the vehicles, or using other methods of tracking the states of a fleet of autonomous vehicles. This periodically broadcast information may include messages providing all state information for a given vehicle. For instance state messages may be self-consistent and generated based on rules about packaging the messages from various systems of the vehicles. As an example, the messages may include vehicle pose, lane information (i.e., in what lane the vehicle is currently traveling), as well as other information, such as whether the vehicle is currently providing transportation services, experiencing any errors or problems, etc.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, to ensure safety when operating a fleet of autonomous vehicles for an autonomous vehicle transportation service, different operations teams and resources such as computing resources and bandwidth may be required. For example, these operations teams may include remote assistance operators (who may monitor vehicle behaviors and/or provide assistance remotely), passenger support agents (who may communicate with passengers during trips), roadside assistance operators (who may provide roadside assistance services such as tire changes and other maintenance services), technical specialists (to address networking and other potential issues), etc. Of course, the number of such operators and agents available may affect the number of vehicles of the fleet that can be driving and providing trip and other services. In order to strike a balance, a model may be generated in order to determine exactly what number of such operators, agents, and other resources are required at any given point in time. In addition, knowing the number of available operators, agents, and other resources may be used to determine how many concurrent trips can be made at any given time and also to make scheduling decisions for trips.

Figure 7:
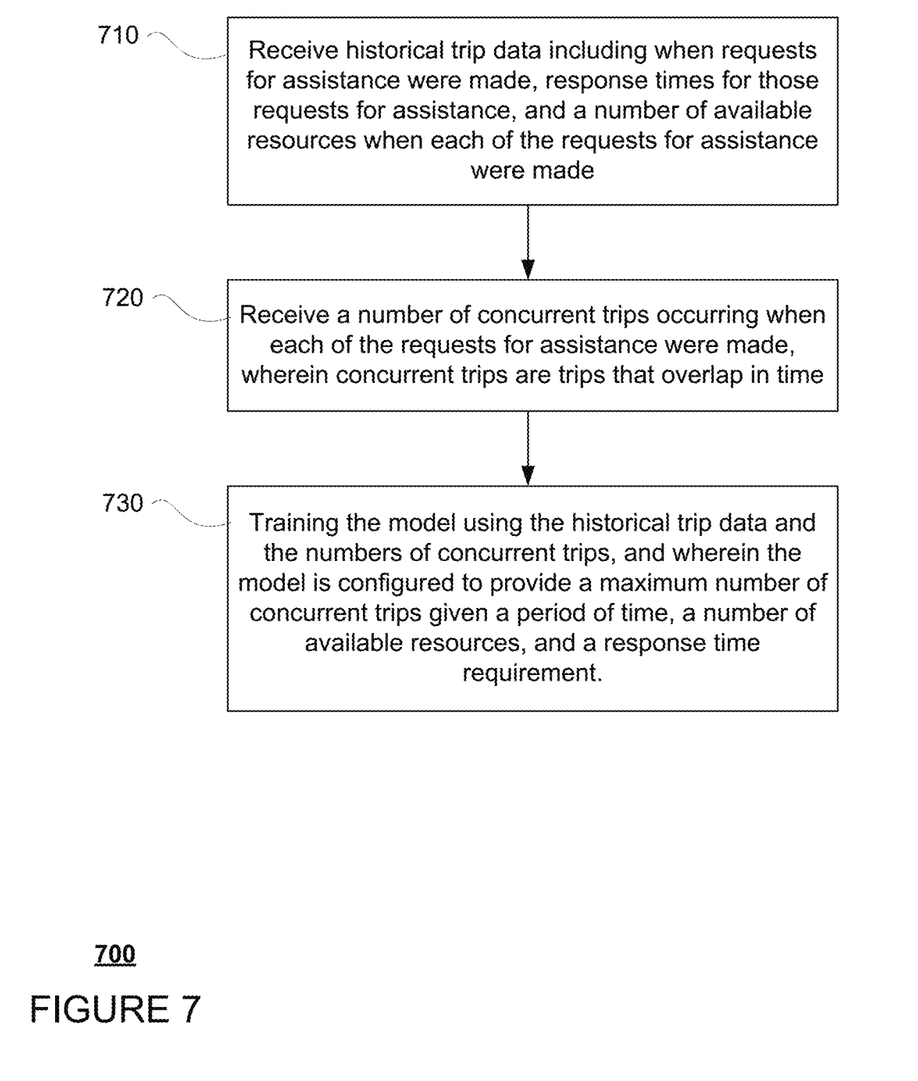
FIG. 7 is an example flow diagram in accordance with aspects of the disclosure.

FIG. 7 provides an example flow diagram 700 for generating a model to assess maximum numbers of concurrent trips for an autonomous vehicle transportation service, which may be performed by one or more processors of one or more server computing devices such as the processors of the server computing devices 410 or another computing device. At block 710, historical trip data including when requests for assistance were made, response times for those requests for assistance, and a number of available resources when each of the requests for assistance were made is received.

The model maybe generated by the server computing devices 410 using historical trip data from the storage system 450. The historical trip data may relate to when vehicles of the fleet have requested assistance (from remote assistance operators or roadside assistance operators), passengers have requested assistance (from passenger support agents), technical specialists have been needed, bandwidth availability, number of concurrent trips, and so on. This information may be collected over time. In addition, each request for assistance (by a vehicle or a passenger) may be associated with a response time, how long it took for a remote assistance operator to resolve an issue with the vehicle or how long it took for a roadside assistance operator to reach the vehicle, or how long it took for a passenger support agent to connect with a passenger.

The response times may also be converted to response rates by the server computing devices 410. For example, 99% of the time, passenger support agents may have responded to passenger requests for assistance within 10 seconds. By using rates, this may allow operators to better utilize the model in order to meet desired expectations with greater flexibility. In addition, different types of response times may be taken into account. For example, longer response times or rates may be acceptable for post-ride checks (e.g. confirming there are no passengers in the vehicle and/or noting has been left behind) as compared to post load checks (e.g. confirming that all passengers are seated and buckled, etc.) and passenger requests for assistance.

Inputs for training the model may include the hour of the day, day of the week, the number of resources, and the aforementioned response times and/or rates. Again, the resources may include the number of remote assistance operators, the number of passenger support agents, the number of roadside assistance operators, the number of technical specialists available, bandwidth availability and so on. Outputs for training the model may include the number of concurrent trips, and the number of concurrent trips or the number of trips that were occurring at the same time. The training may use any number of different approaches, including those which allow for an adaptive learning rate such as Adagrad Gradient Descent.

At block 720 of FIG. 7, a number of concurrent trips that overlap in time which are occurring when each of the requests for assistance were made is received. Regarding the number of concurrent trips, or trips that overlap in time, this may be determined by the server computing devices 410 from the historical trip data. For example, a trip may be considered active or pending from the moment it is assigned to a vehicle to where the vehicle drops off a passenger plus some additional amount of time, such as 10 minutes for more or less, in order to account for any post trip related activities. Based on this, the number of concurrent trips, or statistics for concurrent trips such as the total and average numbers of concurrent trips, may be calculated at every day of week, hour of day (based on trip assignment time), and for different locations or service areas. FIG. 5 represents a plurality of trips, here Trips 1-4, that take place over some period of time. At different points in time, there are different numbers of concurrent trips. For example, at time T1 the number of concurrent trips may be 2, at time T2 the number of concurrent trips may be 3, and at time T3 the number of concurrent trips may be 1 (as there is only 1 trip). In this example, the maximum number of concurrent trips within the particular hour in this example is 3 and the median (average) may be rounded to 2.

Returning to FIG. 7, at block 730, the model is trained using the historical trip data and the numbers of concurrent trips, and wherein the model is configured to provide a maximum number of concurrent trips given a period of time, a number of available resources, and a response time requirement. For example, the model may be used to provide a maximum number of concurrent trips for a particular hour of a particular day of the week given the number of resources available and response time requirements for that particular hour.

Because the number of resources and response times are used as training inputs and numbers of concurrent trips is used as training outputs, for any input hour, day of week, number of available resources, and desired response times, the model may be trained to output the maximum concurrency, or the maximum number of concurrent trips that can be scheduled while still meeting the desired response times. For instance, desired response times may change based on the situation. As an example, people may be okay with a 20 mins response time after a sporting event, but not at lam when calling from a downtown urban area. In this way, the number of concurrent trips is not only limited by the number of available resources, but also response times or rates.

In some instances, the model may be used to run simulations. The simulations may allow operators to tweak certain inputs to see if it is possible to increase the maximum number of concurrent trips with small changes. For example, if both 8 and 10 remote assistance operators with a 5-minute response time can support 15 concurrent trips with a 5-minute response time, then only 8 remote assistance operators may be needed without affecting the response times.

In order to further improve the usefulness of the model, map information for the service area in which the trips occurred, the total trips planned at that hour and day, average duration of those trips, starting and ending points of those trips may be used as training outputs. This may enable the model not only to consider the context in which requests for assistance occur but also how this affects response times, etc. Moreover, once the model is trained, this may enable the model to be used to effectively determine the number of concurrent trips may differ in different geographic areas (e.g. different service areas) by inputting different map information. For instance, it may be easier to have more concurrent trips in areas like Phoenix, Arizona as compared to New York City, New York.

Once the model is generated and trained, it may be used by one or more server computing devices 410 or another computing device when scheduling trips. For example, the model may be used to limit the number of concurrent trips as well as to provide analytics and data to identify situations in which additional resources are required (e.g. in order to meet desired response times). For instance, when scheduling trips, if the maximum number of concurrent trips is reached, certain trips may be scheduled to start earlier or later to avoid concurrency. For example, passengers may be prompted to adjust start times of their trips in order to allow the server computing devices 410 to service such trips once the number of concurrent trips is lower. This may also be used, for example, during commuting hours, for an event (such as a sporting or other event), when vehicles enter high demand areas for trips, or when there is a spike in the number of users accessing the application (even if those users have not yet scheduled a trip). In this regard, the output of the model may be used as a real-time time concurrency limiter.

In other instances, during times the number of concurrent trips is closer to the maximum number of concurrent trips, the server computing devices 410 may attempt to schedule more carpool trips. For example, passengers may be prompted to join carpools. This may increase the number of trips per vehicle without increasing the number of concurrent trips. This may be used, for example, during commuting hours, for an event (such as a sporting or other event), when vehicles enter high demand areas for trips, or when there is a spike in the number of users accessing the application (even if those users have not yet scheduled a trip). For example, if the estimated time of arrival for a vehicle that is still on a trip is greater than the estimated time of arrival of a vehicle available for a carpool, the system may provide, recommend or otherwise suggest the carpool. If not, then the system may not provide a carpool option or suggest that the user take a trip at a different time if the user is interested in a carpool.

This information can be combined with specific data about passengers themselves. For example, if the maximum number of concurrent trips would be greater if another passenger support operator was available and a particular passenger (passenger) is a frequent passenger but as a low rate of requesting assistance, a trip may still be scheduled for that passenger even though the maximum number of concurrent trips would be exceeded.

In addition, if the number of concurrent trips scheduled is significantly lower than the maximum number of concurrent trips, this may be used to determine which resources are not currently needed. In this regard, the model may be used to make staffing decisions for passenger support agents and/or remote assistance operators. For example, if there are too many passenger support agents and not enough remote assistance operators, some passenger support agents may be "repurposed" or reassigned to being remote assistance operators. Similarly, if there are not enough passenger support agents and too many remote assistance operators, some remote assistance operators may be "repurposed" or reassigned to being passenger support agents. In this regard, the system may manage two queues, one for each of the passenger support agents and remote assistance operators so that if the queues for either become too long (e.g. more than 1, an agent or an operator may be repurposed or reassigned in order to keep the queues as small as possible. Once the repurposed agent or operator is finished, the repurposed agent or operator may be returned to their original purpose.

For example, knowing the maximum number or simply the number of concurrent trips scheduled as well as a prediction of the number of post load and post ride checks for those concurrent trips, a prediction of the total amount of time that passenger support agents are needed to perform these checks (e.g. 60 seconds or more or less per check), an estimate of the number of passenger support agents required may be determined. This may be achieved using an Erlang model and using a desired rate (e.g. a percentage of requests answered within a predetermined period). In this regard, the number of passenger support agents that was initially input into the model to determine the maximum number of concurrent trips may be adjusted.

Figure 6:
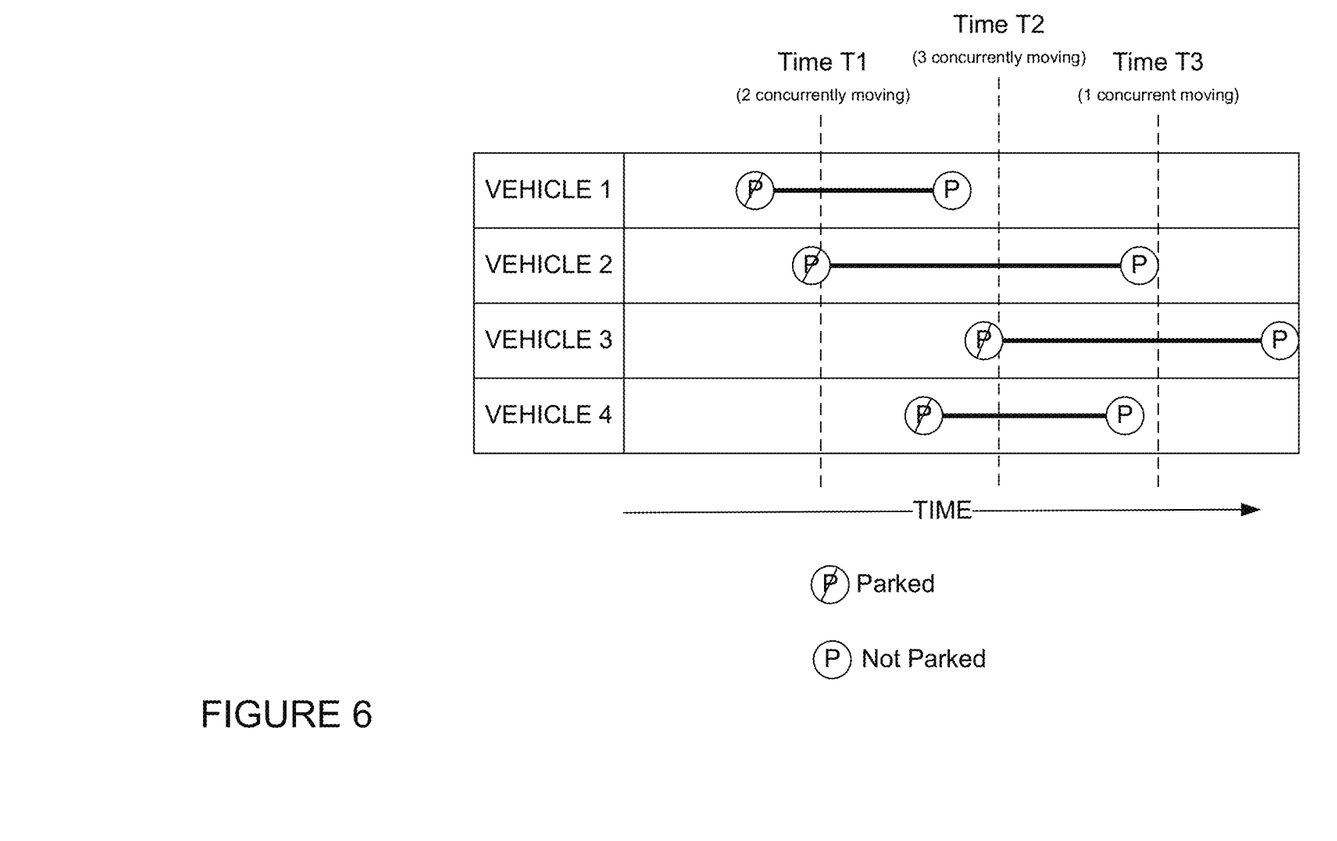
FIG. 6 is an example representation of concurrently moving vehicles in accordance with aspects of the vehicle.

As another example, as a safety measure, remote assistance operators may be required to check in on each vehicle periodically or throughout a trip. In such instances, these check ins may only need to occur when the vehicle is moving and/or servicing a trip (e.g. not moving too slowly such as less than 5 miles per hour, stopped/parked or waiting for a trip to start). The figure below demonstrates the number of remote assistance operators required over a period of time. As the number of moving vehicles changes, the number of remote assistance operators required to check in on those vehicles will also change. As such, based on the total number of trips scheduled within a period of time as well as the starting and ending points of those trips (e.g. start time and end time which would define when vehicles would be likely to be moving or moving at speeds greater than some minimum speed), the number of concurrent trips, and the total number of vehicles, a maximum number of concurrently moving vehicles within the period of time may be determined such as depicted in the FIG. 6. FIG. 6 represents a plurality of vehicles, here vehicles 1-4 (which may correspond to vehicles of the fleet of vehicles including vehicles 100, 100A, 100B) and their movements over some period of time. At different points in time, there are different numbers of concurrently moving vehicles. For example, at time T1 the number of concurrently moving vehicles may be 2, at time T2 the number of concurrently moving vehicles may be 3, and at time T3 the number of concurrently moving vehicles may be 1 (as there is only 1 trip). In this example, the maximum number of concurrently moving vehicles within the particular hour in this example is 3 and the median (average) may be rounded to 2.

This maximum number of concurrently moving vehicles within the period of time may be used to determine the number of remote assistance operators needed. For instance, the number of remote assistance operators needed may be the same as the maximum number of concurrently moving vehicles (e.g. a 1:1 staffing ratio). This number may be adjusted upwards or downwards depending upon what operators believe are acceptable response times. For example, overtime by observing how and for how long remote assistance operators interact with a stopped vehicle, this may be used to adjust the staffing ratio.

Response times can be adjusted based upon the geography in which the vehicles are currently driving and requiring assistance (either remote assistance operators or roadside assistance vehicles). For example, longer response times may be considered acceptable in lower congestion, lower speed areas such as a quiet residential area, whereas shorter response times may be considered necessary in higher congestion, higher speed areas such as a busy traffic intersection or a highway. As such, this information may be factored into the model for determining the maximum number of concurrent trips. As such, the maximum number of concurrent trips may be greater in lower congestion, lower speed areas and lower in higher, congestion, higher speed areas. Moreover, in lower congestion, lower speed areas, it may even be acceptable to have queues for remote assistance operators or roadside assistance operators.

In some instances, the maximum number of concurrent trips can be used to determine how many roadside assistance vehicles are required. For example, the maximum number of concurrent trips can be used to determine how much time autonomous vehicles will speed in a given region. As the number of concurrent trips in the given region increases, the probability of the autonomous vehicles requiring roadside assistance will increase. Certain regions may have trips, but no concurrent ones. As such, those regions may need only one roadside assistance vehicle. If there are multiple concurrent trips in a region, this may require more than one roadside assistance vehicle, depending upon desired response times, etc. In this regard, the maximum number of concurrent trips can be used to determine the number of roadside assistance vehicles will be needed for the given region. If the number of concurrent trips is too low, this can be used as a signal to send a notification to a human operator. For example, the number of actual concurrent trips is <X% of planned concurrent trips then the system may signal to an operator or server to free resources. The value X may vary based on time of day. For example, at 2:00 am if planning for 2 concurrent trips and 1 is happening, the system may not necessarily free resources. But at 4 pm if planning for 30 trips and only 15 are happening the system may free resources. This may enable the human operator to adjust the number of resources in the system as needed.

In addition, the model and other features described herein may be used to determine the number of resources needed may be updated periodically. For instance, as new trips are scheduled for a period of time or as passenger support agents and remote assistant operators go on and off shift or take brakes, the model may be used again to determine the maximum number of concurrent trips and so on.

The features described herein may allow for a fully autonomous transportation service which can automatically balance the number of passengers or trips served with the number of resources currently available. This may make the service both safer and scalable. In addition, by reducing the amount of understaffing and overstaffing, this may improve the overall efficiency of the service while at the same time providing for a service which can meet desired response times and rates without compromising on the ability to service trips.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of generating a model to assess maximum numbers of concurrent trips for an autonomous vehicle transportation service, the method comprising:
   receiving, by one or more processors of one or more server computing devices, historical trip data including when requests for assistance were made, response times for those requests for assistance, and a number of available resources when each of the requests for assistance were made;
   receiving, by the one or more processors, a number of concurrent trips occurring when each of the requests for assistance were made, wherein concurrent trips are trips that overlap in time; and
   training, by the one or more processors, the model using the historical trip data and the numbers of concurrent trips, and wherein the model is configured to provide a maximum number of concurrent trips given a period of time, a number of available resources, and a response time requirement.

2. The method of claim 1, wherein the number of available resources when each of the requests for assistance was made is a number of roadside assistance operators to respond to requests for assistance from vehicles of the service.

3. The method of claim 1, wherein the number of available resources when each of the requests for assistance was made is a number of remote assistance operators to respond to requests for assistance from vehicles of the service.

4. The method of claim 1, wherein the number of available resources when each of the requests for assistance was made is a number of passenger support agents to respond to passenger requests for assistance.

5. The method of claim 1, further comprising determining response rates based on the response times, and wherein the training further involves using the response rates to train the model.

6. The method of claim 1, further comprising, inputting a desired response rate, a number of available resources, and a given period of time into the model in order to determine a maximum number of concurrent trips for the given period of time.

7. The method of claim 6, further comprising, using the maximum number of concurrent trips to determine a number of resources required for the given period of time.

8. The method of claim 7, further comprising, using the number of resources to adjust resource staffing.

9. The method of claim 8, wherein the resource staffing includes a number of roadside assistance operators to respond to requests for assistance from vehicles of the service.

10. The method of claim 8, wherein the resource staffing includes a number of passenger support agents to respond to passenger requests for assistance.

11. The method of claim 10, further comprising, estimating a total amount of time that passenger support agents will be needed during the given period of time, and wherein using the number of resources to adjust resource staffing is further based on the estimated total amount of time.

12. The method of claim 8, wherein the resource staffing includes a number of remote assistance operators to respond to requests for assistance from vehicles of the service.

13. The method of claim 12, further comprising, estimating a maximum number of moving vehicles of the service during the given period of time, and wherein using the number of resources to adjust resource staffing is further based on the estimated maximum number of moving vehicles of the service.

14. The method of claim 1, further comprising, receiving map information for a service area of the service and wherein the training is further based on the map information.

15. The method of claim 1, further comprising, receiving a number of trips planned when the requests for assistance were made and wherein the training is further based on the number of trips planned.

16. The method of claim 15, further comprising, receiving an average duration for the trips planned when the requests for assistance were made and wherein the training is further based on the average durations for the trips planned.

17. The method of claim 15, further comprising, receiving starting and ending points for the trips planned when the requests for assistance were made and wherein the training is further based on the starting and ending points.

18. The method of claim 1, further comprising, using the maximum number of concurrent trips to make trip scheduling decisions.

19. The method of claim 18, wherein using the maximum number of concurrent trips to make trip scheduling decisions includes delaying a start of a trip.

20. The method of claim 18, wherein using the maximum number of concurrent trips to make trip scheduling decisions includes requesting a passenger join a car pool.

21. The method of claim 18, wherein using the maximum number of concurrent trips to make trip scheduling decisions includes requesting that a passenger delay a trip.

22. The method of claim 18, using the maximum number of concurrent trips to make trip scheduling decisions includes scheduling a trip for a passenger based on a history of the passenger requesting assistance.

* * * * *